United States Patent [19]

Shimizu et al.

[11] Patent Number: 5,229,929
[45] Date of Patent: Jul. 20, 1993

[54] OUTPUT PEAK CURRENT CORRECTION FOR PWM INVERTORS

[75] Inventors: Motohiro Shimizu; Masashi Nakamura, both of Wako, Japan

[73] Assignee: Honda Giken Kogyo Kabushiki Kaisha, Tokyo, Japan

[21] Appl. No.: 796,397

[22] Filed: Nov. 22, 1991

[30] Foreign Application Priority Data

Nov. 30, 1990 [JP] Japan .................... 2-333713
Jun. 6, 1991 [JP] Japan .................... 3-162093

[51] Int. Cl.$^5$ .......................................... H02M 7/5387
[52] U.S. Cl. .................................. 363/98; 363/17; 363/132
[58] Field of Search ............... 363/17, 98, 132, 41, 363/95, 97

[56] References Cited

U.S. PATENT DOCUMENTS

| | | | |
|---|---|---|---|
| 4,126,819 | 11/1978 | Stobbe et al. | 363/132 |
| 4,475,149 | 10/1984 | Gallios | 363/17 |
| 4,546,422 | 10/1985 | Okado | 363/17 |
| 4,710,686 | 12/1987 | Guzik | 363/98 |
| 4,757,434 | 7/1988 | Kawabata et al. | 363/98 |
| 4,772,996 | 9/1988 | Hanei et al. | 363/132 |
| 4,803,611 | 2/1989 | Sashida et al. | 363/98 |
| 4,969,079 | 11/1990 | Kiriyama et al. | 363/132 |
| 5,047,910 | 9/1991 | Levran et al. | 363/98 |
| 5,105,352 | 4/1992 | Iwasa et al. | 363/132 |

FOREIGN PATENT DOCUMENTS

59-132398 9/1984 Japan .
60-82098 5/1985 Japan .

Primary Examiner—Steven L. Stephan
Assistant Examiner—Jeffrey L. Sterrett
Attorney, Agent, or Firm—Frishauf, Holtz, Goodman & Woodward

[57] ABSTRACT

A pulse width modulation type invertor device for an AC power unit. In one form of the invention, a waveform detecting circuit detects an waveform of an output alternating current in an output circuit of the invertor device, and a correcting circuit forms a feedback signal indicative of portions of the waveform of the output alternating current which are outside a predetermined range of amplitude, and compares the feedback signal with a sine wave reference signal to amplify a difference between the feedback signal and the sine wave reference signal. A pulse width modulating circuit is responsive to an output from the correcting circuit for forming a pulse width modulated signal. In another form of the invention, a correcting circuit superposes a pair of signals which are indicative of electric current detected via a pair of current-detecting resistances interposed in a pair of electric current passages in a bridge invertor of the invertor device and reverse in phase to each other to form a signal indicative of a waveform of output current, forms a feedback signal indicative of portions of the signal indicative of the waveform of the output current which are outside a predetermined range of amplitude, and corrects a sine wave reference signal based on the feedback signal.

6 Claims, 8 Drawing Sheets

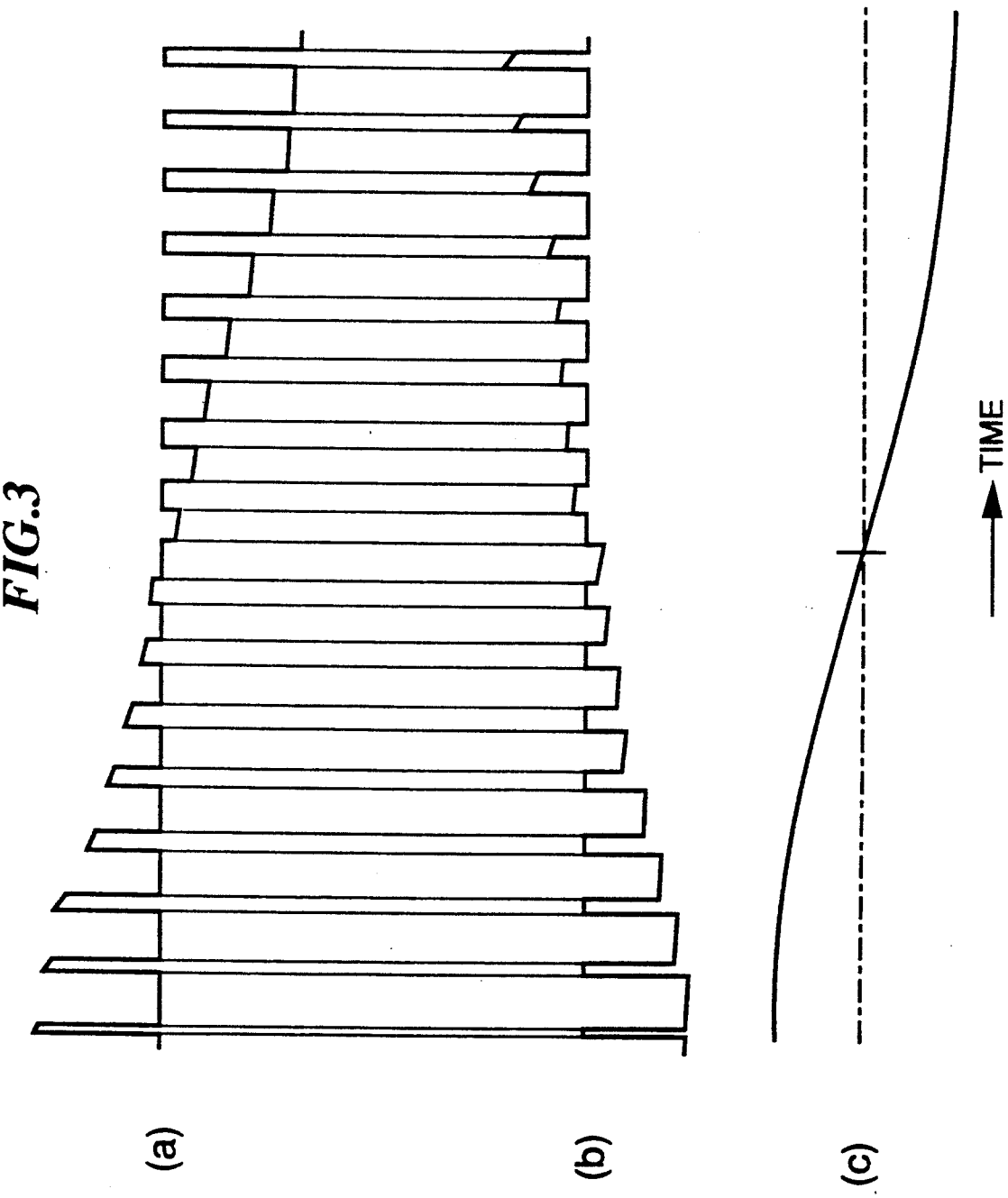

OUTPUT PEAK CURRENT CORRECTION FOR PWM INVERTORS

BACKGROUND OF THE INVENTION

1. FIELD OF THE INVENTION

This invention relates to an invertor device for AC power units, and more particularly to an invertor device of the pulse width-modulation type for use in portable AC power units.

2. PRIOR ART

In recent years, portable AC power units have been increasing in number which are equipped with invertor devices for stabilizing the output frequency. For example, a portable power unit which generates AC power having a commercial frequency by means of an AC generator driven by an engine is known, e.g. by Japanese Provisional Utility Model Publication (Kokai) No. 59-132398, in which the engine is operated within a high speed range to cause the AC generator to generate high AC output, the output is converted into direct current, then the direct current is converted into alternating current by an invertor device, and the alternating current is outputted.

There is a demand for AC power units of this kind whose output waveform is as close to a sine wave dependent upon their application as possible. To this end, an attempt has been made to employ an invertor device of the pulse width-modulation type as the above-mentioned invertor device (Japanese Provisional Patent Publication (Kokai) No. 60-82098).

However, if such an AC power unit is started to operate with a relatively large load connected thereto, starting current can temporarily flow in a large amount to exhibit too large a peak current, which is liable to adversely affect the operation of the AC power unit per se. Therefore, there is also a demand for an AC power unit capable of cutting off such too large a peak current. However, frequent cutoff of the supply of the output AC power will cause inconveniences in actual use.

Further, it is preferable that circuit protection of the AC power unit can be quickly performed also when the load is temporarily short-circuited.

Loads connected to the AC power unit can be of various types having different load characteristics. For instance, if a load having a half-wave rectification characteristic is connected thereto, overload can occur during a half cycle of each cycle of AC power output. In this case, detection of an average output current is not sufficient to ensure proper circuit protection of the AC power unit. If a threshold value indicative of an upper limit of load applicable to the unit for the circuit protection is set to a low level so as to obtain circuit protection in the case of the half-wave rectification load, even a normal current which flows e.g. when a full-wave rectification load is connected, can be regarded as an overcurrent, to improperly effect circuit protection.

SUMMARY OF THE INVENTION

It is a first object of the invention to provide an invertor device for an AC power unit, which is capable of enabling the AC power unit to continue the supply of output current without being adversely affected by a temporary excessive current which can occur at the start of the AC power unit.

It is a second object of the invention to provide an invertor device for an AC power unit, which is provided with circuit protection means which can reliably protect the circuit even from excessive peak current and overload current, as well as from a special overload such as a half-wave rectification overload.

To attain the first object, according to a first aspect of the invention, there is provided an invertor device for an alternating current power unit having a direct current power source circuit, the invertor device including switching means for effecting switching control of an output from the direct current power source circuit, a sine wave-forming circuit for generating a sine wave reference signal having a predetermined frequency, a pulse width modulating circuit for subjecting the sine wave reference signal to pulse width modulation to generate a pulse width modulated signal, a switching control circuit for causing the switching means to perform the switching control based on the pulse width modulated signal from the pulse width modulating circuit, and an output circuit connected to the switching means for generating an alternating current power output having a sinusoidal waveform.

The invertor device according to the first aspect of the invention is characterized by comprising:

a waveform detecting circuit for detecting an waveform of an output alternating current in the output circuit; and a correcting circuit for forming a feedback signal indicative of portions of the waveform of the output alternating current which are outside a predetermined range of amplitude, and comparing the feedback signal with the sine wave reference signal from the sine wave-forming circuit to amplify a difference between the feedback signal and the sine wave reference signal;

wherein the pulse width modulating circuit is responsive to an output from the correcting circuit for forming the pulse width modulated signal.

Preferably, the correcting circuit performs offset amplification of each of the positive and negative half-cycles of a signal indicative of the waveform of the output alternating current in the output circuit to form signals corresponding to the portions of the waveform of the output alternating current which are outside the predetermined range of amplitude, and combine the signals into the feedback signal.

Preferably, the output circuit is composed of coils and a capacitor, and the waveform detecting circuit comprises a current transformer provided between one of the coils and the capacitor.

To attain the first and second objects of the invention, according to a second aspect of the invention, there is provided an invertor device for an alternating current power unit having a direct current power source circuit, the invertor device including a bridge invertor for effecting switching control of an output from the direct current power source circuit, the bridge invertor having at least one common line, and a pair of electric current passages connected in parallel with respect to the common line, a sine waveforming circuit for generating a sine wave reference signal having a predetermined frequency, a pulse width modulating circuit for subjecting the sine wave reference signal to pulse width modulation to generate a pulse width modulated signal, a switching control circuit for causing the bridge invertor to perform the switching control based on the pulse width modulated signal from the pulse width modulating circuit, and an output circuit connected to the bridge invertor for generating an alternating current power output having a sinusoidal waveform.

The invertor device according to the second aspect of the invention is characterized by comprising:

a pair of current-detecting resistances interposed in the pair of electric current passages, respectively, for detecting electric current flowing therethrough; and a correcting circuit for superposing a pair of signals which are indicative of the electric current detected via the pair of current-detecting resistances and reverse in phase to each other to form a signal indicative of a waveform of output current, and forming a feedback signal indicative of portions of the signal indicative of the waveform of the output current which are outside a predetermined range of amplitude, and correcting the sine wave reference signal based on the feedback signal.

Preferably, the bridge invertor includes a plurality of switching elements, the pair of current-detecting resistances being each connected between one of the switching elements and the common line.

Preferably, the correcting circuit performs offset amplification of each of the positive and negative half-cycles of the signal indicative of the waveform of the output current to form signals corresponding to the portions of the signal indicative of the waveform of the output alternating current which are outside the predetermined range of amplitude, and combine the signals into the feedback signal.

The above and other objects, features, and advantages of the invention will be more apparent from the ensuing detailed description taken in conjunction with the accompanying drawings.

BRIEF DESCRIPTION OF THE DRAWINGS

FIG. 3 is a timing chart showing signals at different points in the peak detecting circuit.

DETAILED DESCRIPTION

The invention will now be described in detail with reference to the drawings showing embodiments thereof.

Referring first to FIGS. 1a to 1e, there is shown the whole arrangement of an engine generator (an AC power unit) incorporating an invertor device according to a first embodiment of the invention.

Figure 1A:
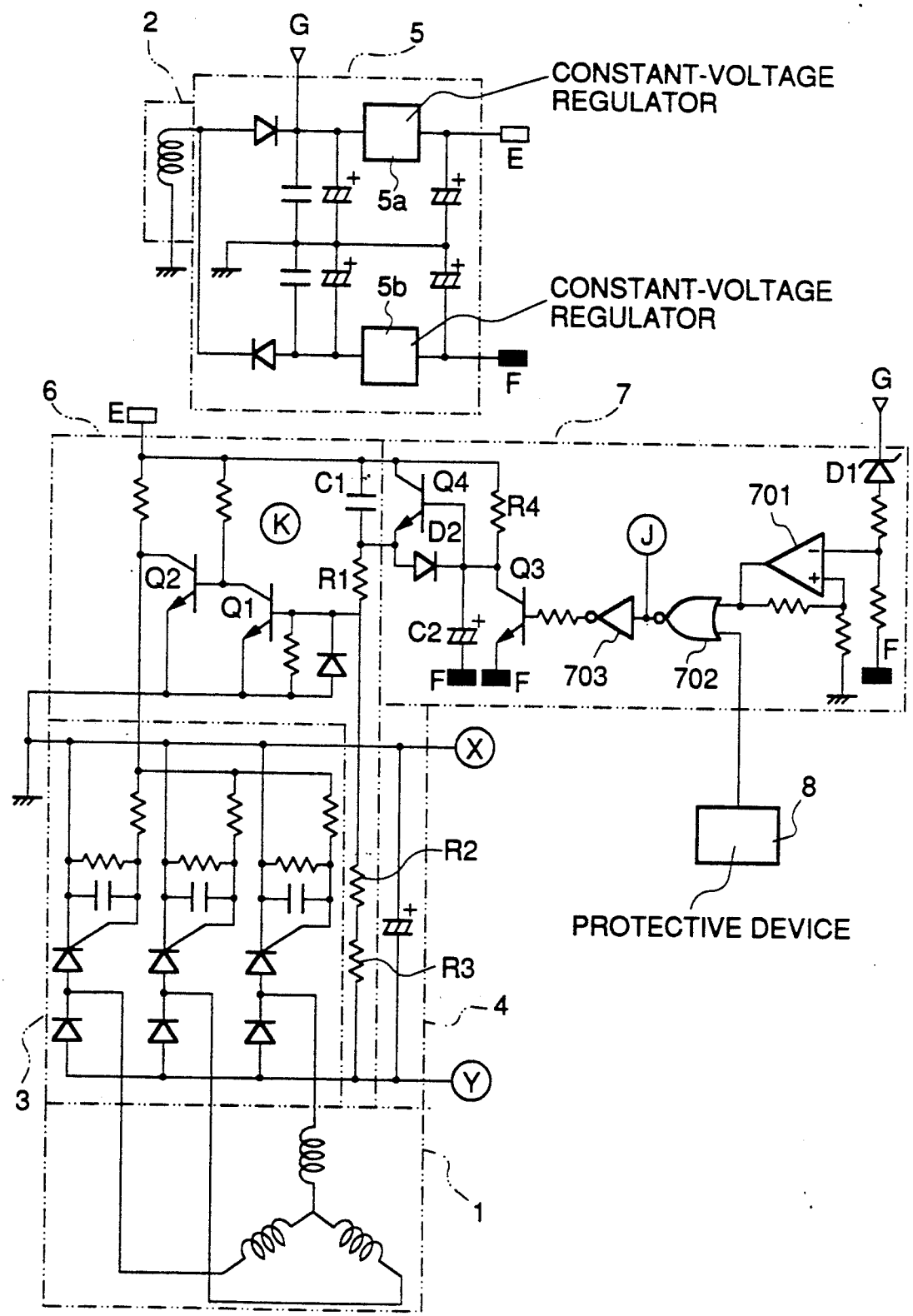
FIG. 1a is a circuit diagram showing component parts of an engine generator, including a bridge rectifier, the engine generator incorporating an invertor device according to a first embodiment of the invention.

In FIG. 1a, reference numerals 1 and 2 designate respectively a three-phase output winding and a single-phase auxiliary winding (control winding) would on a common stator core, not shown, of an AC generator, separately from each other.

A magnet rotor, not shown, having a plurality of magnetic poles is arranged to be rotatively driven by an engine, not shown. The three-phase output winding 1 has its output connected to a bridge rectifier 3 comprised of three thyristors and three diodes, which in turn has its output connected to a smoothing circuit 4.

The single-phase auxiliary winding 2 has its output connected to a constant-voltage regulator circuit 5 having positive and negative output terminals E and F. The constant-voltage regulator circuit 5 has two sets of rectifiers, smoothing circuits, and constant-voltage regulators 5a, 5b, one set being operable in response to current flowing in one direction from the auxiliary winding 2, the other set in response to current flowing in the other direction from the winding 2 so that the output terminals E, F supply positive constant voltage and negative constant voltage, respectively.

Reference numeral 6 designates a thyristor control circuit which has a power source-input terminal connected to the positive output terminal E of the constant-voltage regulator circuit 5, and another terminal grounded together with a positive terminal of the smoothing circuit 4. The thyristor control circuit 6 has a signal-input terminal formed of a series circuit of a capacitor C1, and resistances R1 to R3. One end of the series circuit on the capacitor C1 side is connected to the positive output terminal E of the constant-voltage regulator circuit 5, while the other end of the series circuit on the resistance R3 side is connected to a negative terminal of the smoothing circuit 4. A junction between the resistances R1 and R2 is connected to a base of a transistor Q1, which has a collector connected to a base of a transistor Q2. The transistor Q2 in turn has a collector connected to gate input circuits of the thyristors of the bridge rectifier 3. The thyristor control circuit 6, which is arranged as above, controls input signals to the gate input circuits according to a potential at the junction between the resistances R1 and R2 (details of the thyristor control circuit 6 are disclosed in Japanese Provisional Patent Publication (Kokai) No. 3-93499 filed by the assignee, and therefore detailed description thereof is omitted here).

A junction K between the capacitor C1 and the resistance R1 is connected to the output of a transient inhibit circuit 7. The transient inhibit circuit 7 has a Zener diode D1, which has a cathode connected to an input terminal G of the constant-voltage regulator 5a provided on the positive output terminal E side of the constant-voltage regulator circuit 5, and an anode connected to the negative output terminal F of the constant-voltage regulator circuit 5 as well as to an inverting input terminal of an inverting comparator 701 formed of an operational amplifier, via resistances. The inverting comparator 701 has a non-inverting input terminal grounded via a resistance. The output of the inverting comparator 701 is connected to one input terminal of a NOR circuit 702, which has the other input terminal connected to a protective device 8 which detects a state of the engine generator necessitating protection, such as a state of overcurrent. The protective device 8 supplies a high level signal to the NOR circuit 7 when it detects a state of the engine generator necessitating protection. The output of the NOR circuit 702 is connected via an invertor 703 and a resistance to a base of a transistor Q3. The transistor Q3 has an emitter connected to the negative output terminal F of the constant-voltage regulator circuit 5, and a collector connected to the positive output terminal E of the constant-voltage regulator circuit 5 via a resistance R4 and to the negative output terminal F of the constant-voltage regulator circuit 5 via a capacitor C2. The capacitor C2 has a positive terminal connected to a base of a transistor Q4, which in turn has a collector connected to the positive output terminal E of the constant-voltage regulator circuit 5 and an emitter connected to an anode of a diode D2 and the junction K between the capacitor C1 and the resistance R1 of the thyristor control circuit 6. The diode D2 has a cathode connected to the positive terminal of the capacitor C2.

Figure 1B:
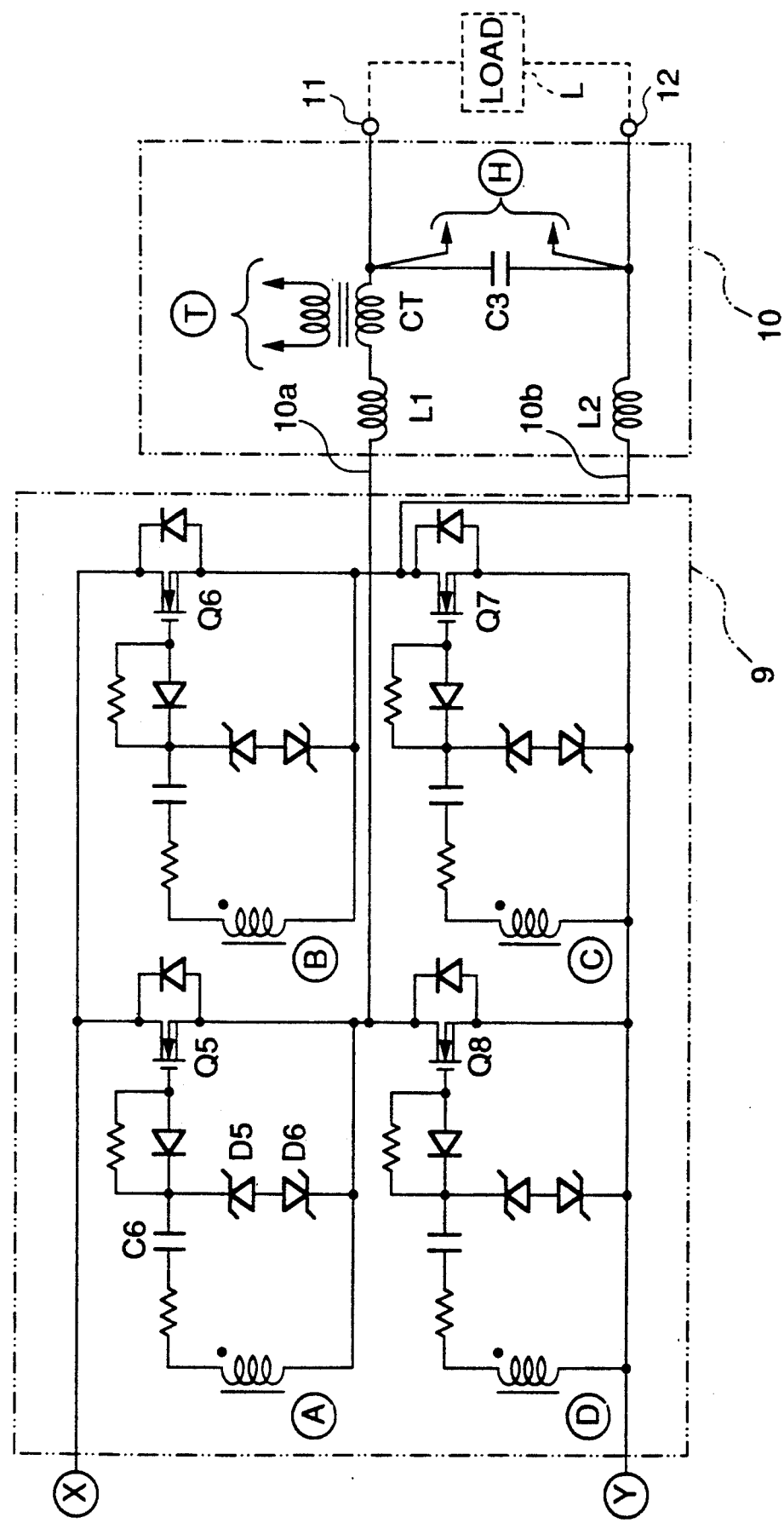
FIG. 1b is a circuit diagram showing a bridge invertor circuit etc., forming part of the invertor device according to the first embodiment.

The smoothing circuit 4 has its output connected to a bridge invertor (switching means) 9 shown in FIG. 1b. The bridge invertor 9 is formed by a bridge circuit composed of four FET's (field effect transistors) Q5–Q8 as switching elements which have their gates connected to FET gate-driving signal circuits 24, 25, hereinafter referred to.

The output of the bridge invertor 9 is connected to output terminals 11 and 12 via output lines 10a, 10b and an output circuit 10. A load L is to be connected to the output terminals 11, 12. The output circuit 10 comprises a low-pass filter formed of coils L1 and L2 connected in series to the load, and a capacitor C3 connected in parallel with the load, and a current transformer CT (waveform detecting circuit) connected in series with the load between the coil L1 and the capacitor C3.

Figure 1C:
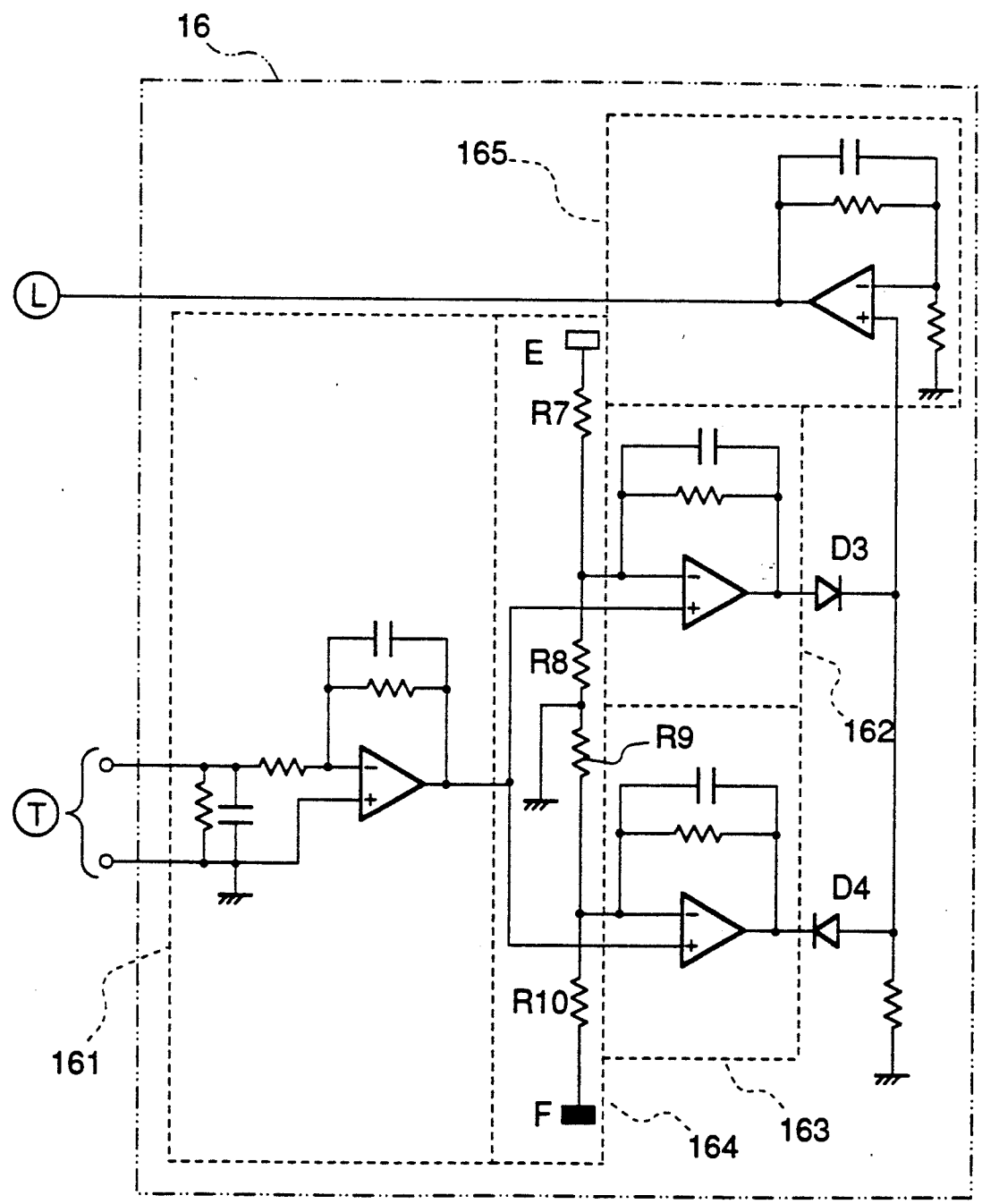
FIG. 1c is a circuit diagram showing a peak detecting circuit, forming part of the invertor device according to the first embodiment.
Figure 1D:
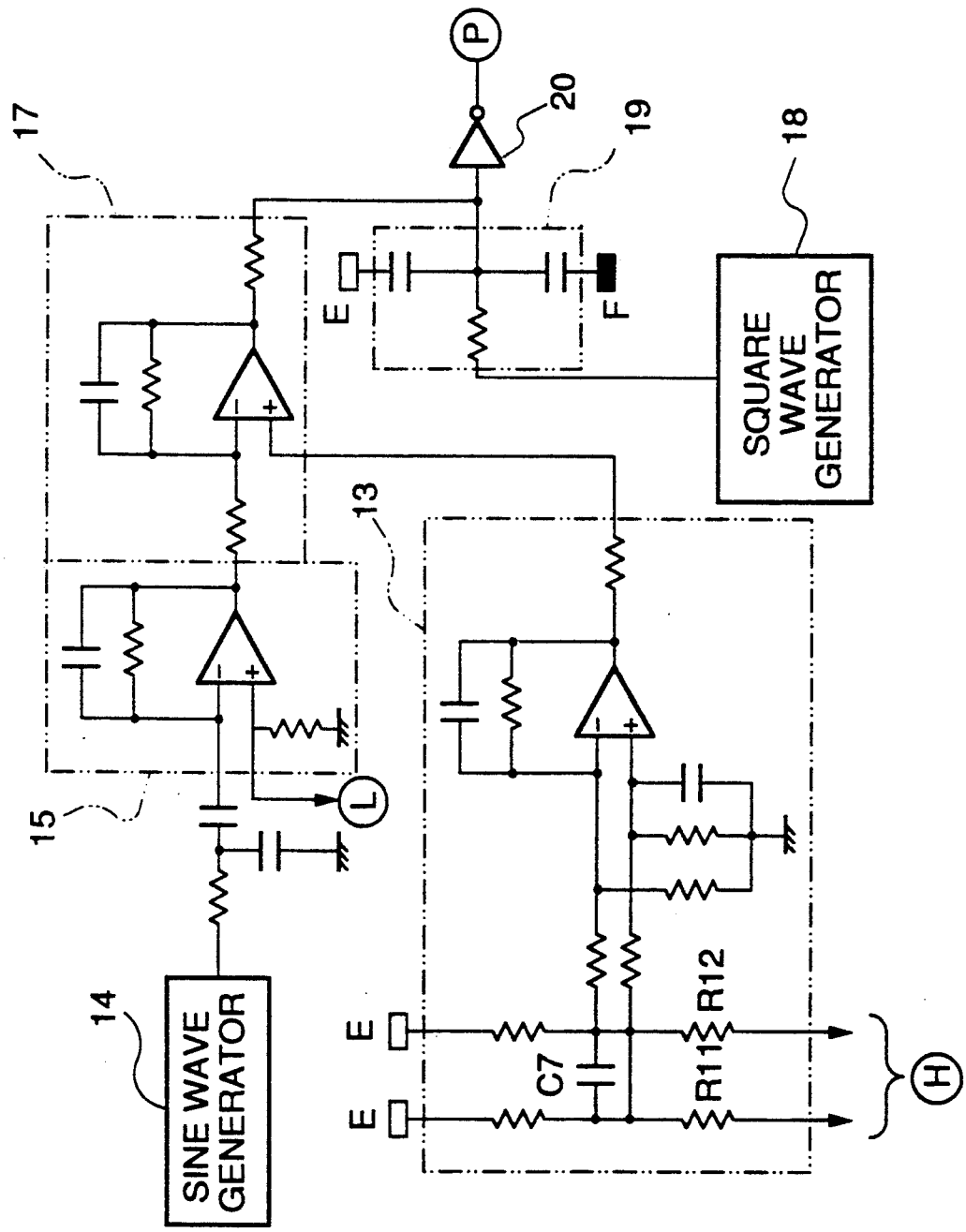
FIG. 1d is a circuit diagram showing a pulse width modulating circuit, etc., forming part of the invertor device according to the first embodiment.

The capacitor C3 of the low-pass filter has its opposite ends H connected to a detecting circuit 13 formed of dividing resistances, a differential amplifier, etc, shown in FIG. 1d. The detecting circuit 13 directly compares between voltages appearing on the output terminals 11 and 12 to thereby detect distortions in the waveform of the engine generator output voltage and an offset component thereof and outputs a signal indicative of the results of the comparison.

In FIG. 1d, reference numeral 14 designates a sine wave generator (a sine wave-forming circuit) which generate a sine wave signal having a commercial frequency, e.g. 50 Hz or 60 Hz. The output of the sine wave generator 14 is connected to an inverting input terminal of a differential amplifier 15, while the output of a peak detecting circuit 16 (shown in FIG. 1c), which forms a correcting circuit together with the differential amplifier 15, is connected to a non-inverting input terminal of the differential amplifier 15. The peak detecting circuit 16 is composed of high-speed operational amplifiers arranged in three stages. The gain of each operational amplifier is set to a value of approx. 10 times to thereby effect a high slew rate. Since the high-gain operational amplifiers and the differential amplifier 15 are arranged in four stages, a high total gain is obtained.

The peak detecting circuit 16 shown in FIG. 1c has the following arrangement: The secondary winding of the current transformer CT is connected to input terminals of an inverting amplifier 161, which in turn has its output connected to non-inverting input terminals of an offset amplifier 162 and an offset amplifier 163.

Reference numeral 164 in FIG. 1c designates an upper and lower limit-setting circuit formed of a series circuit of resistances R7 to R10. One end of the series circuit is connected to the positive output terminal E of the constant-voltage regulator circuit 5 and the other end of same is connected to the negative output terminal F of the constant voltage regulator circuit 5. A junction between the resistances R8 and R9 is grounded. The upper and lower limit-setting circuit 164 supplies a predetermined upper limit voltage to an inverting input terminal of an operational amplifier forming the offset amplifier 162, and a predetermined lower limit voltage to an inverting input terminal of an operational amplifier forming the offset amplifier 163.

The output of the offset amplifier 162 is connected to an anode of a diode D3, while the output of the offset amplifier 163 is connected to a cathode of a diode D4. A cathode of the diode D3 and an anode of the diode D4 are connected to a non-inverting input terminal of an operational amplifier forming a non-inverting amplifier 165, and grounded via a resistance. The output L of the non-inverting amplifier 165 is connected to the non-inverting input terminal of the operational amplifier forming the differential amplifier 165 in FIG. 1d, and grounded via a resistance. The differential amplifier 15 corrects a sine wave reference signal generated from the sine wave generator 14 by a feedback signal dependent on an output current (load current) appearing on the output lines 10a, 10b, as described in detail hereinafter.

The output of the differential amplifier 15 is connected to an inverting input terminal of an operational amplifier forming a differential amplifier 17, while the output of the detecting circuit 13 is connected to a non-inverting input terminal of the operational amplifier forming the differential amplifier 17. The differential amplifier 17 corrects the level of the sine wave reference signal supplied from the sine wave generator 14 by the signal supplied from the detecting circuit 13, and outputs a corrected sine wave reference signal.

Reference numeral 18 designates a square wave generator which generates a square wave signal having a frequency by far higher than the frequency of the sine wave reference signal generated by the sine wave generator 14. The output of the square wave generator 18 is connected to an integrating circuit 19, which integrates the square wave signal into a triangular wave signal.

The corrected sine wave signal from the differential amplifier 17 and the triangular wave signal from the integrating circuit 19 are superposed upon each other and the superposed signal is then supplied to an invertor buffer (pulse width modulating circuit) 20. The invertor buffer 20 is formed by an amplifier with a predetermined fixed threshold level which operates such that when a signal having a level exceeding the threshold level is inputted, it outputs an amplified low level signal, while when a signal having a level below the threshold value is inputted, it outputs an amplified high level signal, thus forming a pulse width modulated (PWM) signal. The invertor buffer 106 may be formed by an IC having a fixed threshold level relative to its gate input level, e.g. a threshold level of a CMOS gate on the input terminal side.

Figure 1E:
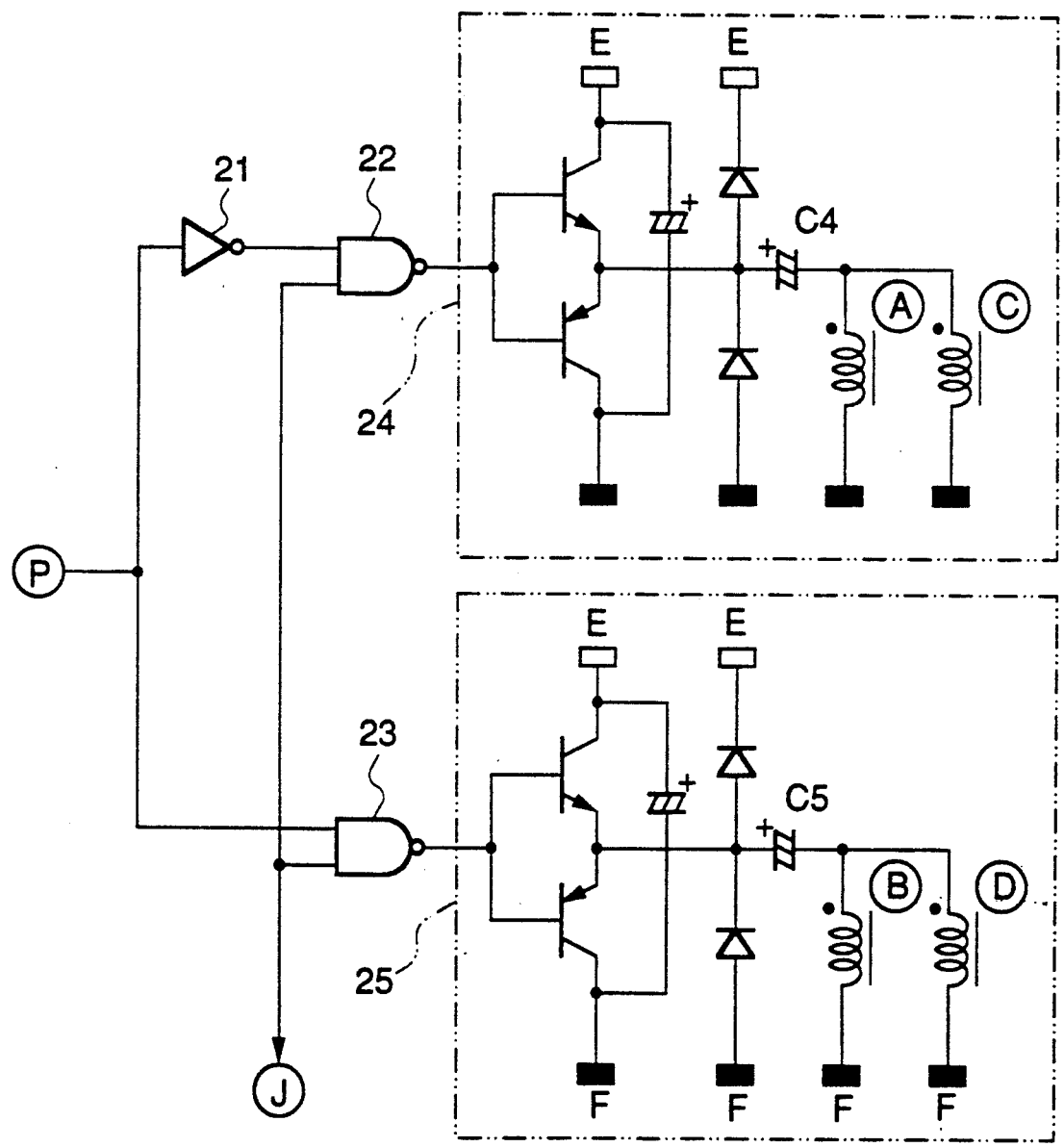
FIG. 1e is a circuit diagram showing circuits for processing signals for driving FET gates appearing in FIG. 1b, forming part of the invertor device according to the first embodiment.

The output of the invertor buffer 20 is connected via an invertor 21 to an input terminal of a NAND circuit 22, and directly connected to an input terminal of a NAND circuit 23, as shown in FIG. 1e, The other input terminals of the NAND circuits 22, 23 are connected to the output J of the NOR circuit 702 of the transient inhibit circuit 7.

The outputs of the NAND circuits 22, 23 in FIG. 1e are connected to the FET gate-driving signal circuits 24, 25. The FET gate-driving signal circuit 24 is composed of a push-pull amplifier, diodes for absorbing surge, a capacitor C4 for eliminating low frequency components, and primary coils of pulse transformers A, C. Similarly, the gate-driving signal circuit 25 is composed of a push-pull amplifier, diodes for absorbing surge, a capacitor C5 for eliminating low frequency components, and primary coils of pulse transformers B, D.

The secondary coil of the pulse transformer A (appearing in the bridge invertor 9 in FIG. 1b) is connected to a gate of the FET Q5 via a damping resistance, a capacitor C6 for reproducing the pulse width modulated signal, and a two-way voltage limiter formed of diodes D5, D6. The secondary coils of the pulse transformers B, C, D are connected to gates of the FET's Q6, Q7, Q8, respectively, via circuits each of which is identical to that described in relation to the secondary coil of the pulse transformer A (the FET gate-driving signal circuits 24, 25, pulse transformers, damping resistances, capacitors for reproducing the PWM signal, a two-way voltage limiter, etc. form a switching control circuit).

The operation of the engine generator including the invertor device constructed as above will now be described.

As the engine generator is driven by the engine, the three-phase output winding 1 generates three-phase AC power which is rectified by the bridge rectifier 3, and then smoothed into DC power by the smoothing circuit 4, while variation in the DC voltage in the smoothing circuit 4 is detected via the resistances R2, R3 by the thyristor control circuit 6, which supplies a signal indicative of the results of the detection to the thyristors of the bridge rectifier 3 to thereby effect on/off control of the thyristors, such that the output voltage from the smoothing circuit 4 is stably kept at a predetermined DC voltage in a feedback manner. In this connection, the thyristor control circuit 6 is also supplied with an output signal from the transient inhibit circuit 7. However, the operation of the thyristor control circuit 6 and the bridge rectifier 3 responsive to the signal will be described later.

The FET's Q5, Q7 and FET's Q6, Q8 of the invertor 9 have their gates supplied with the pulse width-modulated (PWM) signal so that the FET's Q5, Q7 are caused to conduct alternately, and so do the FET's Q6, Q8 to effect switching control of the DC output from the smoothing circuit 4. The switch-controlled output is supplied to the output circuit 10 where high frequency components thereof are removed. The output from the output circuit 10 is supplied through the output terminals 11, 12 to the load as commercial frequency AC power.

The output voltage appearing at the output terminal 11 and the output voltage appearing at the output terminal 12 are supplied to the detecting circuit 13, where they have their high frequency components removed therefrom by a filter circuit composed of resistances R11, R12 and the capacitor C7, and have their commercial frequency components compared with each other by the detecting circuit 13 to detect a difference therebetween, i.e. a distortion in the waveform of the engine generator output voltage or an offset component of same, and a signal indicative of the difference is supplied to the differential amplifier 17.

The sine wave reference signal having the commercial frequency, which is generated by the sine wave generator 14, is corrected with respect to its peak value according to the AC output current by the operation of the differential amplifier 15, described in detail later, and then supplied to the differential amplifier 17.

The differential amplifier 17 compares the corrected sine wave signal from the differential amplifier 15 with the feedback signal from the detecting circuit 13 containing distortions in the waveform of the output voltage and DC offset components of same, and corrects the level of the former by the latter, to output a twice-corrected sine wave signal.

The square wave signal from the square wave generator 18 is integrated by the integrating circuit 19 into the triangular wave signal. This triangular wave signal is superposed upon the corrected sine wave signal from the differential amplifier 17 into a superposed signal, which is supplied to the invertor buffer 20. The invertor buffer 20 operates to generate a low level output when supplied with an input having a level exceeding its threshold level, and generate a high level output when supplied with an input having a level below the threshold level. The resulting pulse train signal outputted from the invertor buffer 20 is the pulse width-modulated (PWM) signal obtained by pulse width modulating the corrected sine wave signal by the triangular signal as the carrier wave. Since the PWM signal is created by the use of the corrected sine wave signal, the AC output current is corrected with respect to its peak value (which will be described hereinafter) as well as the AC output voltage can be corrected such that distortions in the waveform thereof and offset components are reduced. Further, the use of the invertor buffer having a response time (approx. 50 nsec.) by far shorter than that (approx. 1 $\mu$sec.) of a comparator used in conventional PWM type invertor devices affords increasing the frequency of a carrier wave used for forming the PWM signal, which enables to supply AC power having high quality which has an output waveform closer to the waveform of a sine wave.

The PWM signal from the invertor buffer 20 is, on one hand, inverted by the invertor 21 and then supplied to the NAND circuit 22, while on the other hand it is directly supplied to the NAND circuit 23. The NAND circuits 22, 23 are supplied with a low level signal from the transient inhibit circuit 7, when a state of the engine generator necessitating the circuit protection, such as an overcurrent state of same, is detected, or a low engine rotational speed, which will occur when the engine starts or on other occasions, is detected. In this case, the NAND circuits 22, 23 continue to output high level signals irrespective of the pulse level of the PWM signal, thus the PWM signal being prevented from being transmitted to the invertor 9. When neither a state of the engine generator necessitating the circuit protection nor a low engine rotational speed is detected, the NAND circuits 22, 23 are supplied with a high level signal from the transient inhibit circuit 7. In this case, the NAND circuits 22, 23 are responsive to inverted and non-inverted PWM signals supplied thereto to output signals obtained by inverting the inverted and non-inverted PWM signals, respectively. Accordingly, the FET gate-driving signal circuit 24 is supplied with the non-inverted PWM signal, while the FET gate-driving signal circuit 25 is supplied with the inverted PWM signal.

In the FET gate-driving signal circuit 24, the PWM signal is subjected to push-pull amplification, and has its low frequency components, i.e. commercial frequency components, cut off by the capacitor C4. Before passing the capacitor C4, the PWM signal has constant amplitude with respect to the reference level but the average voltage (integrated value) of this signal varies with the same period as the sine wave signal from the sine wave generator 14. Therefore, this PWM signal contains a component of the same frequency as that of the sine wave signal (commercial frequency). The PWM signal is converted by the capacitor C4 into a pulse train which varies as a whole in reverse phase to the commercial frequency component and always has a zero average voltage.

This pulse train always having a zero average voltage is applied to the primary coils of the pulse transformers A, C. Therefore, cores of the pulse transformers A, C are almost not magnetically saturated due to the commercial frequency component, making it possible to use small-sized transformers A, C without the fear of being magnetically saturated at the PWM carrier frequency.

The FET gate-driving signal circuit 25 operates just similarly to the FET gate-driving circuit 24.

An output pulse signal from the secondary coil of the pulse transformer A is compared with the breakdown voltage of each of the Zener diodes D5, D6 forming the two-way voltage limiter. The capacitor C6 is charged or discharged by voltage portions of the pulse signal exceeding the corresponding breakdown voltages, so that a voltage occurs across the capacitor C6, which is an average voltage of the amounts by which the output pulse signal exceeds the breakdown voltages of the Zener diodes D5, D6, the average voltage having the commercial frequency. Therefore, a signal which is obtained by superposition of the terminal voltage of the capacitor C6 having the commercial frequency and the output pulse signal from the secondary coil of the pulse transformer A, i.e. the PWM signal before passing the capacitor C4, is reproduced between the gate and source of the FET Q5. The FET Q5 conducts while each positive pulse of the PWM signal is applied to its gate.

An output pulse signal from the secondary coil of the pulse transformer C is also processed in the same manner as the output pulse signal from the pulse transformer A. Thus, the FET's Q5 and Q7 conduct simultaneously.

Output pulse signals from the secondary coils of the pulse transformers B, D are processed in the same manner as the output pulse signals from the secondary coils of the pulse transformers A, C. However, since the PWM signal supplied to the pulse transformers A, C and the PWM signal supplied to the pulse transformers B, D are reverse in phase to each other, the FET's Q6, Q8 do not conduct when the FET's Q5, Q7 conduct, and the FET's Q5, Q7 do not conduct when the FET's Q6, Q8 conduct.

As described above, the invertor 9 carries out switching control based upon a PWM signal which is formed by modulating by a high frequency triangular wave signal a sine wave signal having a commercial frequency which is corrected in a feedback manner based on the output waveform, and then a carrier frequency component contained in the switched output from the invertor 7 is removed by the output circuit 10, whereby alternating current output having the commercial frequency, which is close in waveform to the sine wave signal is supplied through the output terminals 11, 12 to the load.

For further details of the construction and operation of the circuit arrangement of the bridge invertor 9 and the detecting circuit 13 through the FET gate-driving signal circuit 25 (except the differential amplifier 15 and the peak detecting circuit 16), reference should be made to Japanese Patent Application No. 2-307823 filed by the assignee and having a corresponding U.S. application.

Next, the operation of the transient inhibit circuit 7 will be described.

Immediately after the engine is started, the output voltage of the AC generator is low, so that the voltage at the input terminal of the constant-voltage regulator 5a forming part of the constant-voltage regulator circuit 5 is low. Therefore, at the start of the engine, the voltage at the input terminal of the constant-voltage regulator 5a does not exceed the breakdown voltage of the Zener diode D1 (voltage corresponding to a predetermined engine rotational speed which is lower than the engine rotational speed to be assumed during normal operation of the engine generator), which prevents the Zener diode D1 from conducting. Accordingly, the inverting input terminal of the inverting comparator 701 remains at a low level, and therefore the inverting comparator 701 outputs a high level signal.

Since the NOR circuit 702 outputs a low level signal when it is supplied with a high level signal via at least one of its input terminals, the output from the NOR circuit 702 is low either when the inverting comparator 701 outputs a high level signal or when the protective device 8 outputs a high level signal.

The low level signal from the NOR circuit 702 is inverted by the invertor 703 into a high level signal, which causes the transistor Q3 to conduct, thereby allowing the capacitor C2 to be discharged. Accordingly, the transistor Q4 does not conduct, which results in a low level of potential at the junction K between the capacitor C1 and the resistance R1.

As a result, the transistor Q1 of the thyristor control circuit 6 remains off to cause the transistor Q2 to conduct, so that the gates of the thyristors of the bridge rectifier 3 are supplied with a low level signal. This prevents the thyristors from conducting and hence the bridge rectifier 3 does not supply a rectified output. In short, when the engine rotational speed is lower than a predetermined value, or when a state of the engine generator necessitating the circuit protection is detected, the bridge rectifier 3 is inhibited from supplying the rectified output, whereby an unstable operation of the invertor device at the start of the engine as well as the power supply in a state of the engine generator necessitating the circuit protection is prevented.

Then, when the output voltage from the AC generator gradually increases after the start of the engine, which causes the voltage at the input terminal of the constant-voltage regulator 5a to rise to a level exceeding the breakdown voltage of the Zener diode D1, that is, when the engine rotational speed exceeds the predetermined value, the Zener diode D1 conducts to convert the voltage supplied to the inverting input terminal of the inverting comparator 701 into a high level, and hence the inverting comparator 701 outputs a low level signal.

At this time, if a state necessitating the circuit protection is not detected, the output from the NOR circuit 702 goes high, and hence the output from the invertor 703 goes low. Accordingly, the transistor Q3 turns off to cause the capacitor C2 to be charged by way of the resistance R4. As the capacitor C2 is thus charged, the potential at the positive terminal of the capacitor C2 gradually rises in accordance with a time constant determined by the capacity of the capacitor C2 and the resistance value of the resistance R4. Responsive to a rise in the potential at the positive terminal of the capacitor C2, the transistor Q4 conducts, which causes a potential at the emitter of the transistor Q4 to rise. However, if the potential at the emitter of the transistor Q4 becomes higher than a potential at the base of the transistor Q4, the transistor Q4 turns off. As a result, the potential at the junction K between the capacitor C1 and the resistance R1 is constantly held at a value slightly lower than the potential at the positive terminal of the capacitor C2. Therefore, the potential at the junction K gradually rises in accordance with the time constant determined by the capacity of the capacitor C2 and the resistance value of the resistance R4, after the engine rotational speed has exceeded the predetermined value.

The thyristor control voltage (between X and Y), which is proportional to the potential at the junction K, gradually rises. Finally, the potential at the junction K substantially reaches the positive output potential of the constant-voltage regulator circuit 5, and the gate voltage at the thyristors reaches a predetermined input value for feedback control carried out for maintaining a potential at the junction between the resistances R1 and R2 at a predetermined level.

Thus, even if the engine is started in a state where the output terminals 11, 12 are connected to a load, it is possible to prevent electric current from rushing into the thyristors of the bridge rectifier 3 when the engine generator is in an unstable state in which the output voltage of the AC generator is not sufficiently high. This in turn prevents application of a drastically-changing voltage to the FET's of the bridge invertor 9 when the engine generator is in an unstable state. The effects of this preventive operation are greater as the load connected to the output terminals 11, 12 at the start of the engine is heavier. Particularly when the load is short-circuited, adverse effects on the thyristors and the FET's are very effectively prevented.

Next, the operation of the peak detecting circuit 16 and the differential amplifier 15 forming the correcting circuit will be described.

First, AC output current is detected by the current transformer CT. The AC output current is thus detected at a point between the coil L1 of the output circuit 10 and the capacitor C3 of same. Therefore, it is possible to detect electric current flowing through the invertor 9 without delay in phase. Further, it is possible to detect the AC output current free from disturbances accompanying drastic changes in the output voltage of the invertor 9 which occur as the invertor 9 performs switching operation.

The detected AC output current (commercial frequency signal) is inversely amplified by the inverting amplifier 161 of the peak detecting circuit 16 and then supplied to the offset amplifiers 162, 163. The offset amplifier 162 compares the amplitude of the commercial frequency signal supplied to the non-inverting input terminal of the operational amplifier thereof with the predetermined upper limit voltage supplied from the upper and lower limit-setting circuit 164 to the inverting input terminal of same, and amplifies only a portion (a peak portion in a positive half-cycle) of the voltage of the commercial frequency signal exceeding the predetermined upper limit voltage as a threshold value for determining an excessive peak current (so-called "offset amplification"). The offset amplifier 163 compares the amplitude of the commercial frequency signal supplied to the non-inverting input terminal of the operational amplifier thereof with the predetermined lower limit voltage supplied from the upper and lower limit-setting circuit 164 to the inverting input terminal of same, and amplifies only a portion (a peak portion in a negative half-cycle) of the voltage of the commercial frequency signal lower than the predetermined lower limit voltage as a threshold value for determining an excessive peak current (so-called "offset amplification"). The outputs from the offset amplifiers 162, 163 pass the diodes D3, D4, respectively, and are then superposed on each other. A signal resulting from this superposition is a composite signal of a voltage portion of the amplified commercial frequency signal which is higher in voltage than the predetermined upper limit voltage and a voltage portion of the amplified commercial frequency signal which is lower in voltage than the predetermined lower limit voltage. When the amplified commercial frequency signal is neither higher than the upper limit voltage nor lower than the lower limit voltage, the composite signal is held at a zero level.

The composite signal is amplified by the non-inverting amplifier 165, and then supplied to the non-inverting input terminal of the operational amplifier of the differential amplifier 15. The differential amplifier 15 compares the composite signal with the sine wave signal from the sine wave generator 14, and performs differential amplification, i.e. amplifies the difference between the two signals. More specifically, when the AC output current becomes so large that the level of a peak portion in a positive or negative half-cycle of the commercial frequency signal falls above or below the predetermined upper or lower limit voltage, i.e. portions of the waveform of the AC output current falls outside the range determined by the predetermined upper and lower limits of amplitude, the sine wave signal is corrected in a feedback manner responsive to the amount of the peak portion above or below the predetermined upper or lower limit such that the peak portion of the sine wave signal is made flat. The sine wave signal which is thus corrected with respect to its peak portions is then supplied to the differential amplifier 17.

As a result, the AC output current obtained by pulse width modulation based on the corrected sine wave signal has a waveform having peak portions made flat. That is, its peak current value is thus limited. In this connection, it should be noted that when overcurrent flows, only the peak current value is delimited, but the supply of the AC output current per se is not cut off, which enables to continue the supply of the AC output power to a load which would cause a temporary excessive rise in the peak current, without any difficulty. Further, since the AC output power is supplied while suppressing its current solely with respect to the peak value thereof, the engine generator is capable of quickly reaching its normal operating condition even when it is started to operate with a load which causes a large starting current, such as an electric motor.

Figure 2A:
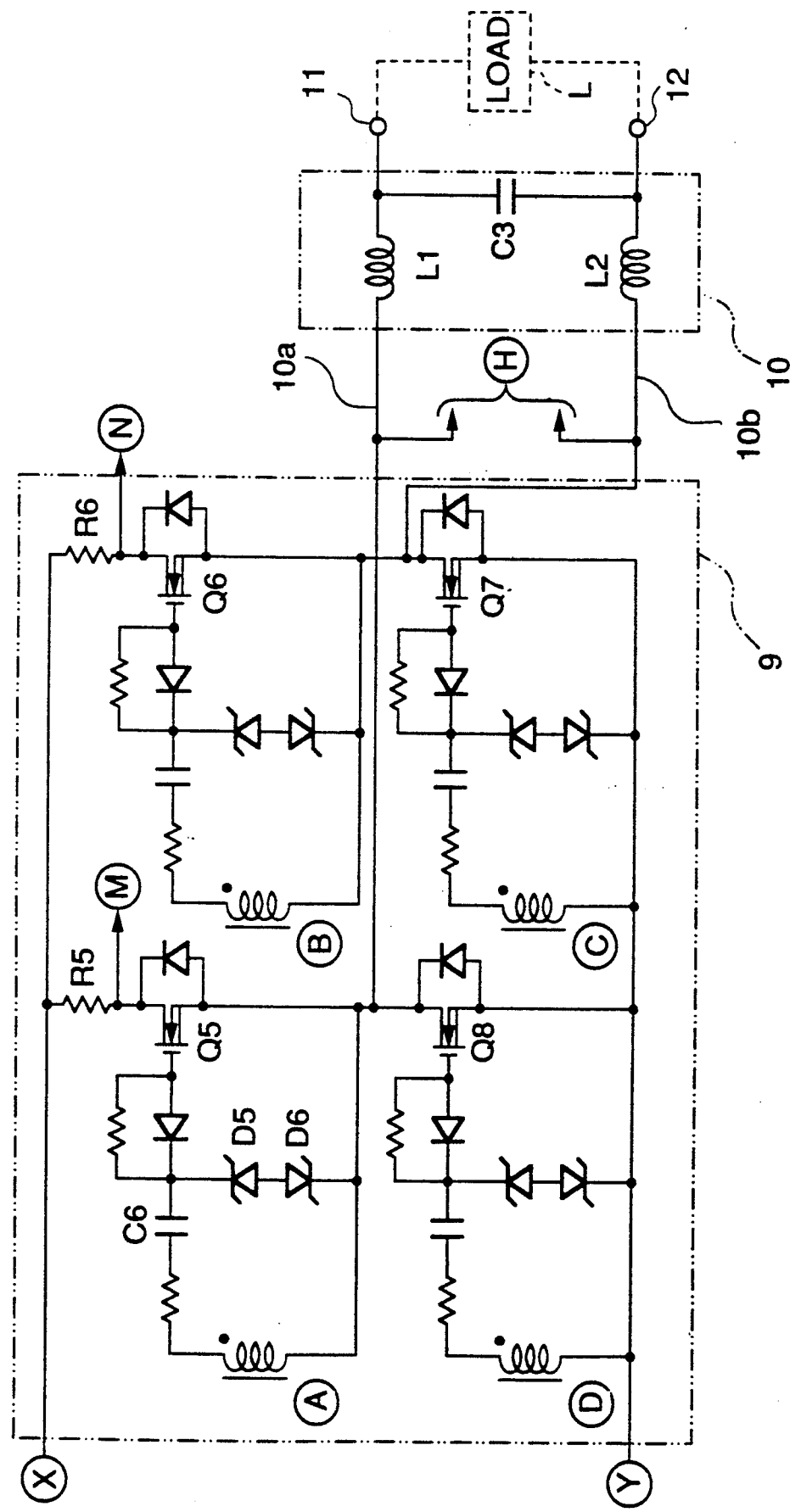
FIG. 2a is a circuit diagram showing a bridge invertor circuit etc., forming part of the invertor device according to a second embodiment of the invention and corresponding to FIG. 1b of the first embodiment.
Figure 2B:
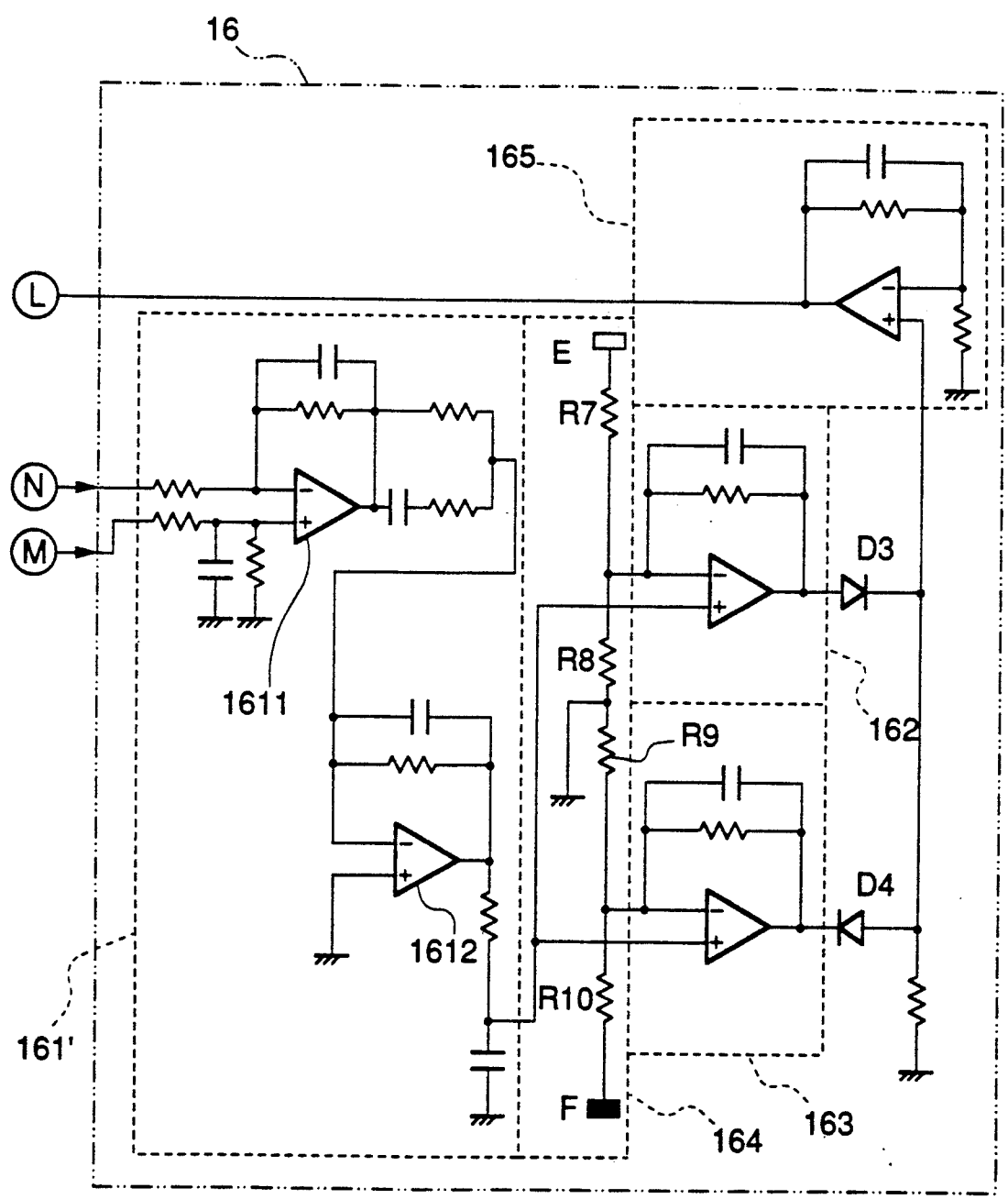
FIG. 2b is a circuit diagram showing a peak detecting circuit, forming part of the invertor device according to the second embodiment of the invention and corresponding to FIG. 1c of the first embodiment.

Next, a second embodiment of the invention will be described with reference to FIGS. 2a and 2b showing circuit portions corresponding to those shown in FIGS. 1b and 1c of the first embodiment. As shown in FIGS. 2a and 2b, the second embodiment is distinguished from the first embodiment mainly in that a signal indicative of the AC output current is detected in the form of two separate voltages composed of DC components and reverse in phase to each other by means of current-detecting resistances R5, R6 serially connected to the FET's Q5, Q6 provided in two electric current passages of the bridge invertor, respectively, in place of the current transformer CT, i.e. the AC output current can be detected in the form of direct current obtained from one half of each cycle. The other circuit parts are substantially identical in construction with those in FIGS. 1a, 1d, and 1e, and therefore, these figures will be referred to in the description of the second embodiment.

More specifically, in the invertor 9, resistances R5 and R6 for detecting load current are additionally connected between drains of the FET's Q5 and Q6 and a common line grounded. Accordingly, the current transformer CT provided between the coil L1 and the capacitor 3 in the first embodiment is omitted.

The output lines 10a, 10b are connected to the detecting circuit 13 in FIG. 1d. The detecting circuit 13 directly compares between output voltages appearing on the output lines 10a, 10b to thereby detect distortions in the waveform of the output voltage from the engine generator and offset components of same and output a signal indicative of the distortions and the offset components. In this embodiment, the detecting circuit 13 has an additional function of removing carrier waves. Therefore, preferably, the detecting circuit 13 in this embodiment is provided with means for removing the carrier waves, as distinct from the detecting circuit 13 in the first embodiment. The means may be realized by different setting of a CR constant (time constant).

The peak detecting circuit 16 of the second embodiment has the following construction: An amplifier 161' is a two-stage type comprised of a first-stage amplifier 1611 and a second-stage amplifier 1612. Junctions M, N between the resistances R5, R6 and the FET's Q5, Q6 are connected to a non-inverting input terminal of the first-stage amplifier 1611 of the two-stage amplifier 161' and an inverting input terminal of same, respectively. The output of the first stage amplifier 1611 is connected to an inverting input terminal of the second-stage amplifier 1612 via an output line 161a. A non-inverting input terminal of the second-stage amplifier 1612 is grounded. The output of the amplifier 1612 is connected to the non-inverting input terminals of the offset amplifiers 162 and 163.

The two-stage amplifier 161' forming part of the correcting circuit of the present embodiment operates in the following manner:

Across the resistances R5, R6 in the bridge invertor 9, there occurs voltages depending on the output current (load current) from the bridge invertor 9. FIG. 3 (a) shows a waveform of current detected at the junction M. A waveform of current detected at the junction N is reverse in phase to the waveform of current detected at the junction M, as shown in FIG. 3 (b). Signals indicative of currents detected at the junctions M, N (output current signals) are supplied to the non-inverting input terminal and inverting input terminal of the operational amplifier 1611 of the peak detecting circuit 16. The operational amplifier 1611 forms an integrating circuit, where the signals indicative of currents detected at the junctions M, N have their high frequency components removed therefrom. When attention is paid to the signal indicative of a current detected at the junction M alone, a signal containing the DC component and commercial frequency component appears at the output of the operational amplifier 1611. This signal is inversely amplified by the operational amplifier 1612 forming an integrating circuit into a commercial frequency signal having high frequency components removed therefrom as shown in FIG. 3 (c), which is supplied to the offset amplifiers 162, 163.

The offset amplifier 162 compares the amplitude of the commercial frequency signal supplied to the non-inverting input terminal of the operational amplifier thereof with the predetermined upper limit voltage supplied from the upper and lower limit-setting circuit 164 to the inverting input terminal of same, and amplifies only a portion (a peak portion in a positive half-cycle) of the voltage of the commercial frequency signal exceeding the predetermined upper limit voltage as a threshold value for determining an excessive peak current (so-called "offset amplification"). The offset amplifier 163 compares the amplitude of the commercial frequency signal supplied to the non-inverting input terminal of the operational amplifier thereof with the predetermined lower limit voltage supplied from the upper and lower limit-setting circuit 164 to the inverting input terminal of same, and amplifies only a portion (a peak portion in a negative half-cycle) of the voltage of the commercial frequency signal lower than the predetermined lower limit voltage as a threshold value for determining an excessive peak current (so-called "offset amplification"). The outputs from the offset amplifiers 162, 163 pass the diodes D3, D4, respectively, and are then superposed on each other. A signal resulting from this superposition is a composite signal of a voltage portion of the amplified commercial frequency signal which is higher in voltage than the predetermined upper limit voltage and a voltage portion of the amplified commercial frequency signal which is lower in voltage than the predetermined lower limit voltage. When the amplified commercial frequency signal is neither higher than the upper limit voltage nor lower than the lower limit voltage, the composite signal is held at a zero level.

The composite signal is amplified by the non-inverting amplifier 165, and then supplied to the non-inverting input terminal of the operational amplifier of the differential amplifier 15. The differential amplifier 15 compares the composite signal with the sine wave signal from the sine wave generator 14, and performs differential amplification, i.e. amplifies the difference between the two signals. More specifically, when the AC output current becomes so large that the level of a peak portion in a positive or negative half-cycle of the commercial frequency signal falls above or below the predetermined upper or lower limit voltage, i.e. portions of the waveform of the AC output current falls outside the range determined by the predetermined upper and lower limits of amplitude, the sine wave signal is corrected in a feedback manner responsive to the amount of the peak portion above or below the predetermined upper or lower limit such that the peak portion of the sine wave signal is made flat. The sine wave signal which is thus corrected with respect to its peak portions is then supplied to the differential amplifier 17.

As a result, the AC output current obtained by pulse width modulation based on the corrected sine wave signal has a waveform having peak portions made flat. That is, its peak current value is thus limited. In this connection, it should be noted that when overcurrent flows, only the peak current value is delimited, but the supply of the AC output current per se is not cut off, which enables to continue the supply of the AC output power to a load which would cause a temporary excessive rise in the peak current, without any difficulty.

The AC output current is thus detected, so that as shown in FIG. 3 (b) and (c), even when the engine generator is connected to a special load, such as a half-wave rectification load, the DC component is not lost. Therefore, it is possible to accurately detect a peak current value and hence properly suppress overcurrent.

Further, since the AC output power is supplied while suppressing its current solely with respect to the peak value thereof, the engine generator is capable of quickly reaching its normal operating condition even when it is started to operate with a load which causes a large starting current, such as an electric motor.

Further, since load current values are detected via the current-detecting devices provided in two electric current passages of the bridge invertor, load current values can be detected in the form of direct current obtained from one half of each cycle, which enables to accurately detect peak values of the combined AC output current, and even accurately detect excessive current when the engine generator is connected to a special load, such as a half-wave rectification load. Thus, it is made possible to properly suppress excessive current in an offset state which occurs when the engine generator is connected to a special imbalanced load, such as a half-wave rectification load.

What is claimed is:

1. An invertor device for an alternating current power unit having a direct current power source circuit, said invertor device comprising:
    switching means for effecting switching control of an output from said direct current power source circuit;
    sine wave-forming circuit means for generating a sine wave reference signal having a predetermined frequency;
    pulse width modulating circuit means for subjecting said sine wave reference signal to pulse width modulation to generate a pulse width modulated signal;
    switching control means coupled to said switching means for causing said switching means to effect said switching control based on said pulse width modulated signal from said pulse width modulating circuit means;
    output circuit means coupled to said switching means for generating an output alternating current signal having a sinusoidal waveform;
    waveform detecting circuit means for detecting a waveform of an output alternating current signal in said output circuit means; and
    correcting circuit means including:
        means for forming a feedback signal which indicates that said output alternating current signal is excessively flowing only when the amplitude of said waveform of said output alternating current signal is outside a predetermined range of amplitudes; and
        means for comparing said formed feedback signal with said sine wave reference signal from said sine wave-forming circuit means and for amplifying a difference between said feedback signal and said sine wave reference signal so that said sine wave reference signal is changed to a corrected signal which is suppressed solely with respect to peak portions thereof; and
    wherein said pulse width modulating circuit means is responsive to an output from said correcting circuit means for forming said pulse width modulated signal so that only peak values of said output alternating current are limited within said predetermined range of amplitudes.

2. An invertor device according to claim 1, wherein:
    said correcting circuit means further includes means for performing offset amplification of each of the positive and negative half-cycles of a signal indicative of the waveform of said output alternating current signal in said output circuit means, so as to form signals corresponding to said portions of said waveform of said output alternating current signal which are outside said predetermined range of amplitudes, and to combine said signals into said feedback signal.

3. An invertor device according to claim 1, wherein:
    said output circuit means comprises a plurality of coils and a capacitor; and
    said waveform detecting circuit means comprises a current transformer coupled between one of said plurality of coils and said capacitor.

4. An invertor device for alternating current power unit having a direct current power source circuit, said invertor device comprising:
    bridge invertor means for effecting switching control of an output from said direct current power source circuit, said bridge invertor means including at least one common line, and a pair of electric current passages connected in parallel with respect to said common line;
    sine wave-forming circuit means for generating a sine wave reference signal having a predetermined frequency;
    pulse width modulating circuit means for subjecting said sine wave reference signal to pulse width modulation to generate a pulse width modulated signal;
    switching control means for causing said bridge invertor means to effect said switching control based on said pulse width modulated signal from said pulse width modulating circuit means;
    output circuit means coupled to said bridge invertor means for generating an output alternating current signal having a sinusoidal waveform;
    a pair of current-detecting resistance means interposed in said pair of electric current passages, respectively, for detecting electric current flowing therethrough; and
    correcting circuit means including:
        means for superposing a pair of signals which are indicative of said electric current detected by said pair of current-detecting resistance means and which pair of signals are reverse in phase to each other to form a signal indicative of a waveform of output current;
        means for forming a feedback signal which indicates that said output alternating current is excessively flowing only when the amplitude of said signal indicative of said waveform of said output current is outside a predetermined range of amplitudes; and
        means for correcting said sine wave reference signal based on said feedback signal so that said sine wave reference signal is changed to a corrected signal which is suppressed solely with respect to peak portions thereof, said corrected signal being output to said pulse width modulating circuit means; and
    wherein only peak values of said output alternating current signal are limited within said predetermined range of amplitudes.

5. An invertor device according to claim 4, wherein;
said bridge invertor means includes a plurality of switching elements; and
said pair of current-detecting resistance means being each connected between one of said switching elements and said at least one common line.

6. An invertor device according to claim 4, wherein:
said correcting circuit means further includes means for performing offset amplification of each of the positive and negative half-cycles of the signal indicative of said waveform of said output alternating current signal, so as to form signals corresponding to said portions of said signal indicative of said waveform of said output alternating current signal which are outside said predetermined range of amplitudes, and to combine said signals into said feedback signal.

* * * * *